No. 651,910. Patented June 19, 1900.
W. WHITELEY.
CLIP.
(Application filed Mar. 10, 1900.)
(No Model.) 3 Sheets—Sheet 1.
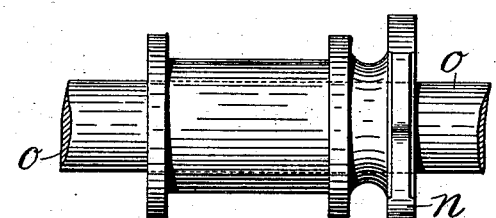
Fig. 2.
Fig. 1.
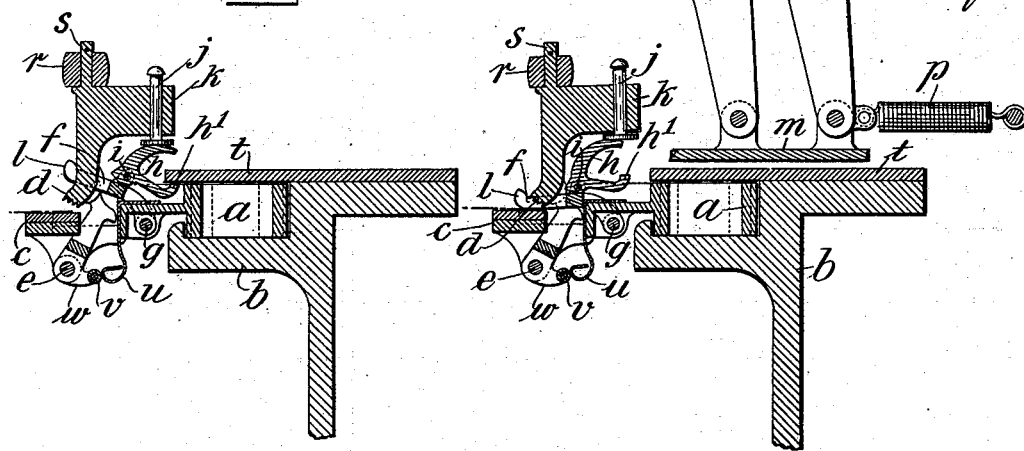
Fig. 5.
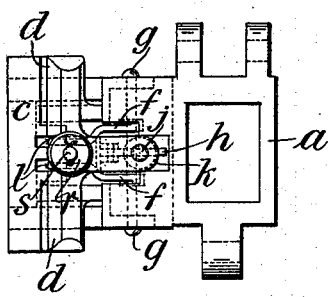
Witnesses:
A. G. Heylmun.
J. Sprigg Poole
Inventor:
William Whiteley
by Herbert W. T. Jenner.
Attorney.
THE NORRIS PETERS CO., PHOTO-LITHO., WASHINGTON, D. C.

No. 651,910. Patented June 19, 1900.
W. WHITELEY.
CLIP.
(Application filed Mar. 10, 1900.)
(No Model.) 3 Sheets—Sheet 2.
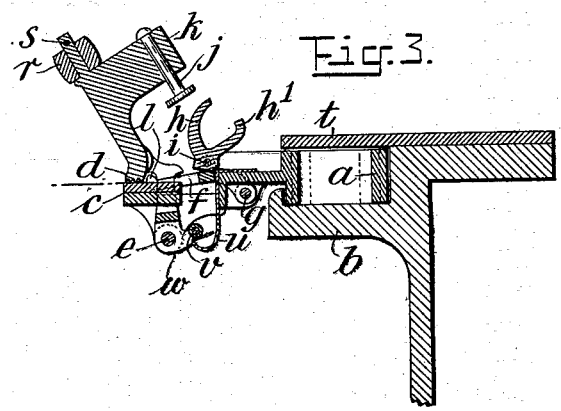
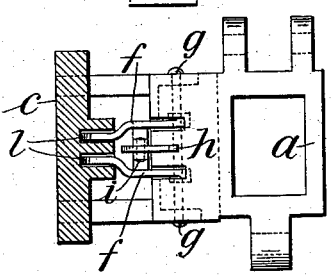
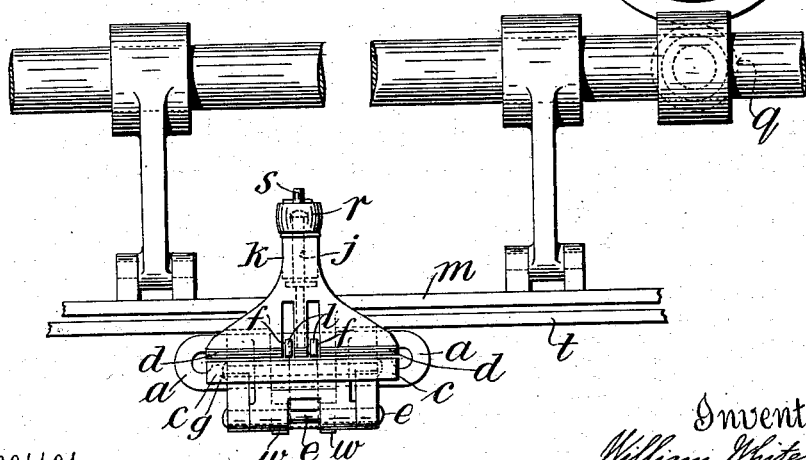
Witnesses:
Inventor:
William Whiteley.
by Herbert W. Jenner.
Attorney.

No. 651,910. Patented June 19, 1900.
W. WHITELEY.
CLIP.
(Application filed Mar. 10, 1900.)
(No Model.) 3 Sheets—Sheet 3.
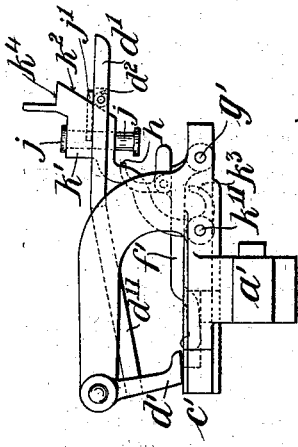
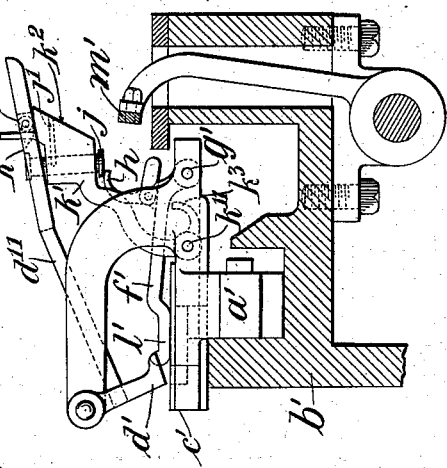
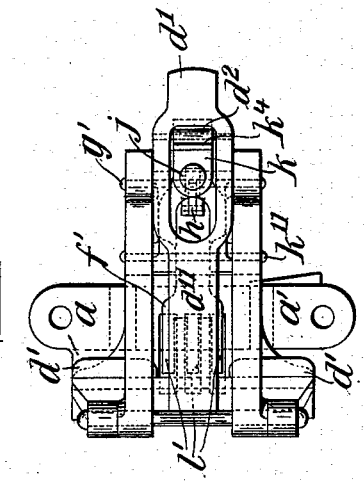
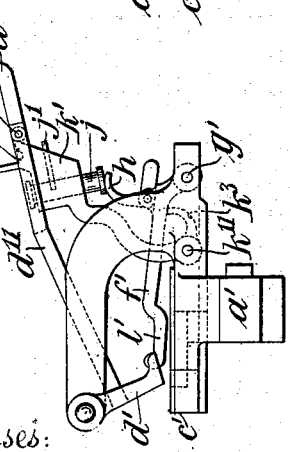
Witnesses:
R. G. Heylmun.
J. Sprigg Poole.
Inventor:
William Whiteley.
by Herbert W. S. Jenner.
Attorney.

UNITED STATES PATENT OFFICE.

WILLIAM WHITELEY, OF HUDDERSFIELD, ENGLAND.

CLIP.

SPECIFICATION forming part of Letters Patent No. 651,910, dated June 19, 1900.

Application filed March 10, 1900. Serial No. 8,163. (No model.)

*To all whom it may concern:*

Be it known that I, WILLIAM WHITELEY, a subject of the Queen of Great Britain, residing at Huddersfield, in the county of York, England, have invented certain new and useful Improvements in Clips Used in Machines for Tentering and Stretching Fabrics; and I do hereby declare the following to be a full, clear, and exact description of the invention, such as will enable others skilled in the art to which it appertains to make and use the same.

This invention relates to clips employed in machines for tentering, stentering, and stretching fabrics.

The clips herein referred to have reference to self-feeding return clips—that is to say, where there are two or more layers of fabric one above another—and also to self-feeding clips employed when there is only one layer of fabric—that is to say, when the fabric is taken off at the opposite end to which it is fed.

In order to describe my improvements in such clips more fully, I will make reference to the accompanying drawings, illustrative thereof, wherein—

Figure 1 is a cross-section of the link-and-chain slide and is in position to receive a wet or fresh supply of fabric. Fig. 2 is another section showing the prongs of the feeler resting upon the cloth. Fig. 3 is another section showing the upper gripper pushed over and having seized hold of the selvage of the cloth. Fig. 4 is a plan view of Fig. 3 with the upper gripper removed so as to show the feelers more clearly. Fig. 5 is a plan view of Fig. 1, and Fig. 6 is a front elevation of Fig. 2. Fig. 7 is a side view showing a modification of the clip. Fig. 8 is a similar view showing also the rail in cross-section and the end of the feeler resting on the cloth. Fig. 9 is a side view of the clip shown in Fig. 7, with the foot of the upper gripper resting on the cloth. Fig. 10 is a plan view of the parts shown in Fig. 8.

$a$ represents the body or link of the chain, a series of which are connected together by rivets, pins, or other suitable means, forming an endless chain, one of such chains being placed on each side of the machine. The chains work in the chain-slide $b$. The lower jaw $c$ of the gripper is stationary and forms part of the link $a$. The upper jaw $d$ is mounted upon a stud or pin $e$. The feeler is represented at $f$ and is capable of oscillating or rocking upon a stud or pin $g$. The feeler carries a double horn $h$, pivoted at $i$ on the top of said feeler. Upon the top of the horn $h$ is the base of the drop-pin $j$, capable of moving up and down freely in boss $k$, forming part of the upper gripper. I wish it to be understood that so long as the prongs $l$ of the feeler $f$ are resting upon the fabric the horn $h$ and feelers $f$ bear the weight only of the pin $j$. Consequently the feeler rests very lightly upon the fabric, which is greatly desired. When the fabric leaves the ends of the prongs $l$ of the feelers, they drop off the said fabric into recesses or grids in the bottom jaw $c$, in doing which the horn $h$ is removed from under the base of the pin $j$, permitting such pin to drop, immediately after which the vibrating plate $m$ strikes the base or thrust-piece of the said pin, forcing the upper jaw $d$ upon its fulcrum $e$ and down upon the bottom jaw $c$, thereby seizing hold of the selvage of the fabric which travels through the machine until the fabric is required to be released.

The vibrating plate $m$ has a constantly-intermittent motion imparted to it through the medium of a cam or tappet $n$, mounted upon a revolving shaft $o$, which is placed across the machine. There are two cams $n$, one at each side of the machine, and they are capable of sliding laterally on their shafts $o$ by means of a groove and key, as will be well understood. A spiral spring $p$ is used for forcing the bowl $q$ into contact with the cam or tappet $n$ when it is necessary to remove the fabric from the grip of the clips after it has run its course through the machine, the clips or claws being automatically raised from the selvage of the fabric by means of a pulley or bowl $r$ coming in contact with an inclined plate in the ordinary manner. This bowl $r$ is mounted on the upper end of a projection or vertical stud $s$, rising up from the upper gripper $d$. The movement of the bowl $r$ opens the claws or grippers and releases the cloth, and simultaneously therewith the feeler $f$, with the horn $h$, is replaced under the head of the pin $j$, and this takes place when the clip is returning on its last course toward the feeding end of the machine. When the fabric is released at the bottom of the machine and the jaws opened, the feelers $f$ are raised and the part $h'$ of the horn $h$ rides under the plate $t$ some distance; but by the time a fresh supply of cloth is introduced the part $h'$ of the horn $h$ arrives at the end of the plate $t$, whereupon the parts assume the position shown in Fig. 2, placing the feeler upon the fabric. The upper gripper $d$ is kept open or closed upon the fabric by means of the flat spring $u$ acting against the pulley $v$, carried on arms $w$, cast on the bottom of the upper gripper.

The clip so far described has had reference to a return clip which travels over and under the fabric; but I will now describe how my improvements can be applied to a self-feeding clip employed when there is only one layer of fabric—that is to say, where the fabric is taken off at the opposite end to which it is fed. This form of clip is illustrated in Figs. 7, 8, 9, and 10. $a'$ represents the link working in a stationary rail or slide $b'$ in which the chain works. $c'$ is the lower jaw, on which the fabric rests, and $f'$ is the feeler, the forward end $l'$ being formed of prongs or forks for resting lightly upon the cloth. The feeler is mounted upon a stud or pivot $g'$ and is provided with a swiveling upwardly-projecting horn $h$, upon which the base of the drop-pin $j$ rests. When the fabric has passed from under the prongs of the feeler, the said feeler drops into a grid or grate formed in the plate of the bottom gripper $c'$, in doing which the horn $h$ moves away from underneath the drop-pin, as shown at Fig. 9, the said pin falling into the way of a quickly-vibrating bar $m'$, whereupon the rocking lever $k$ is forced upon its fulcrum $k''$, bringing the upper gripper down upon the cloth.

The action of the clip is as follows: The upper gripper $d'$ is connected to the end of a lever-arm $d''$, and as the link is traveling its course through the machine it rides upon an incline which places the lever-arm $d''$ into position shown in the drawings. The outward end of this lever-arm is provided with a peg or pin $d^2$, (see Fig. 9,) which rides up the inclined surface $k^2$ of the rocking lever, and it will be observed that in the drop-pin $j$ is a horizontal pin $j'$, and this is employed for the purpose of raising the drop-pin to its highest position, as shown in Fig. 7. On the continued upward movement of the lever-arm $d''$ the horn $k^3$ at the bottom of the rocking lever $k'$ lifts the feeler out of the grid into which it has fallen. The upward movement of the feeler, Fig. 7, places its horn $h$ under the drop-pin until the pin or stud $d^2$ reaches the sneck $k^4$ on the top of the rocking lever $k'$. This movement removes the upper gripper from contact with the cloth, as shown at Fig. 7, when it is then ready for a fresh supply of cloth.

To the best of my knowledge and belief in all clips hitherto made and constructed the feeler has had to bear the whole weight or a portion of the weight of the upper nipping-jaw; but in this my invention the feeler when on the selvage of the cloth bears the weight only of a light drop-pin or its equivalent, which is acted upon by a separate and independent moving object.

I claim as my invention—

1. In a clip, the combination, with a lower jaw which moves bodily with the carrier, of an upper jaw pivoted to the lower jaw, a feeler pivoted to the lower jaw, a movable thrust-piece carried by the upper jaw, and a horn carried by the said feeler and supporting the thrust-piece clear of the actuating-tappet when the feeler is resting on the cloth, substantially as set forth.

2. In a clip, the combination, with a pair of pivoted jaws which move bodily with the carrier, of a feeler pivoted to one of the said jaws, a movable thrust-piece carried by the other said jaw, and a horn carried by the said feeler and supporting the said thrust-piece clear of the actuating-tappet when the feeler is resting on the cloth, substantially as set forth.

3. In a clip, the combination, with a pair of pivoted jaws which move bodily with the carrier, one of the said jaws being provided with a recess arranged under the cloth, of a feeler pivoted to the said jaw and normally supported over the said recess by the cloth, a movable thrust-piece carried by the other said jaw, and a horn carried by the said feeler and operating to permit the thrust-piece to move into the path of the operating-tappet when the cloth is withdrawn and the feeler drops into the said recess, substantially as set forth.

4. In a clip, the combination, with a pair of pivoted jaws which move bodily with the carrier, of a feeler pivoted to one of the said jaws, a movable thrust-piece carried by the other said jaw, a horn carried by the said feeler and supporting the thrust-piece clear of the actuating-tappet when the feeler is resting on the cloth, a stationary plate, and a second horn carried by the said feeler and operating when engaged by the said plate to hold the feeler clear of the cloth, substantially as set forth.

In testimony whereof I affix my signature in presence of two witnesses.

WILLIAM WHITELEY.

Witnesses:
ARTHUR CROSSLEY,
THOMAS H. BARRON.